United States Patent [19]

Kay

[11] 4,054,059
[45] Oct. 18, 1977

[54] PRESSURE GAUGE

[76] Inventor: Francis Xavier Kay, Yew Tree Cottage, 30 Sheep Street, Winslow, Bucks., England

[21] Appl. No.: 644,323

[22] Filed: Dec. 24, 1975

[30] Foreign Application Priority Data

Dec. 30, 1974 United Kingdom ............... 56073/74

[51] Int. Cl.$^2$ .............................................. G01L 7/08
[52] U.S. Cl. .................................................. 73/407 R
[58] Field of Search ................. 73/406, 408, 409, 300, 73/393, 146.8, 146.3, 146.2, 407 R; 267/162

[56] References Cited

U.S. PATENT DOCUMENTS

| 1,265,676 | 5/1918 | Klump | 73/406 |
|---|---|---|---|
| 2,105,127 | 1/1938 | Petroe | 73/407 R |
| 2,296,237 | 9/1942 | Allen | 73/406 |
| 2,566,369 | 9/1951 | Putman | 73/406 |
| 3,466,024 | 9/1969 | Spieth | 267/162 |
| 3,610,046 | 10/1971 | Lissau | 73/407 R |
| 3,643,510 | 2/1972 | Lissau | 73/406 |
| 3,901,083 | 8/1975 | Wallace | 73/409 |

Primary Examiner—Donald O. Woodiel
Attorney, Agent, or Firm—Kurt Kelman

[57] ABSTRACT

A pressure gauge comprises a gauge vessel filled with an indicating liquid that extends as a column into a reader tube; the gauge vessel has a deflectable wall portion such as a diaphragm that is resiliently biased, as by a plate spring pack in the gauge vessel, to resist inwards deflection under fluid pressure applied to a gauge port to which the deflectable wall portion is exposed. Deflection of the wall portion alters the liquid column length in the reader tube to indicate pressure.

Differential and pressure-summing gauges are disclosed, as well as temperature-compensating arrangements.

3 Claims, 1 Drawing Figure

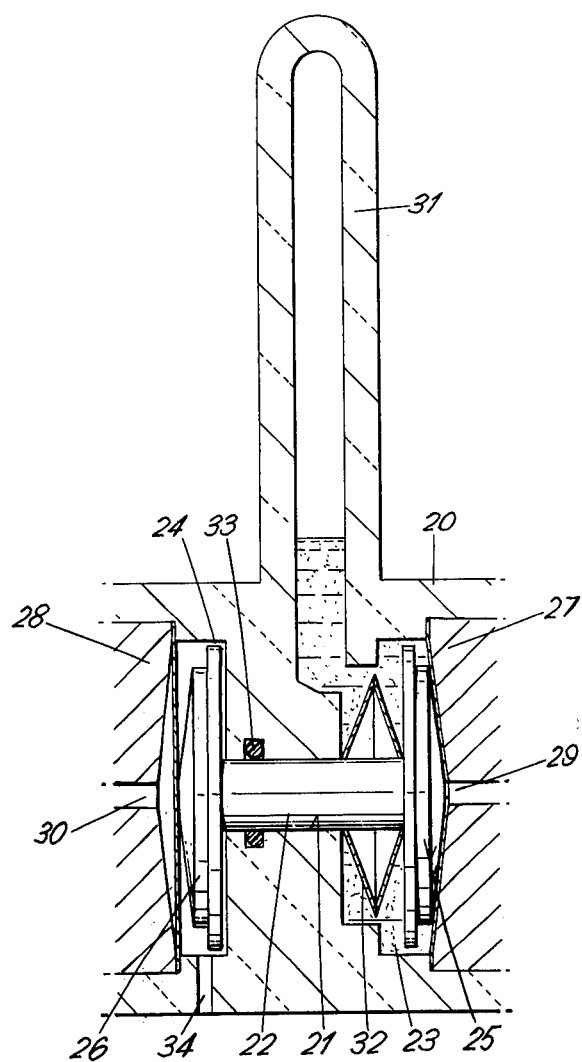

PRESSURE GAUGE

FIELD OF THE INVENTION

This invention concerns pressure gauges and has for its object the provision of a simple and robust pressure gauge construction well suited to mass production techniques and readily adaptable to measurement of pressures within different ranges.

BACKGROUND OF THE INVENTION

There are two conventional types of pressure gauge that directly indicate values of fluid pressure applied to a gauge port: thus there is the Bourdon gauge and its derivatives, and like arrangements, in which pressure at a gauge port is applied to a containment element such as a bent tube, a capsule or a diaphragm to cause deformation of that element, an indicating mechanism linked to the element causing relative movement between an indicating element such as a pointer and a graduated scale in consequence of such deformation. The second conventional type of pressure gauge is the manometer and its derivatives, in which pressure at a gauge port is balanced by the hydrostatic pressure at the base of a liquid column so that the height of the column is a measure of the pressure at the gauge port.

THE INVENTION

In a pressure gauge in accordance with the invention a gauge vessel contains an indicating liquid and communicates with a reader tube into which the liquid extends as a column for a distance determined by the liquid volume relative to the instantaneous internal volume of the vessel, the latter having at least one deflectable wall portion so exposed to a first gauge port that first fluid pressure applied to said gauge port tends to move said wall to reduce the internal volume of said vessel and to cause liquid to be displaced therefrom into said reader tube.

A second fluid pressure is applied to a second gauge port and the deflectable wall portion is indirectly exposed to the second fluid pressure to produce a force on the deflectable wall portion opposing that arising from the first pressure. Biasing means acts on the deflectable wall portion to oppose its deflection in response to the first pressure.

The gauge vessel comprises a rigid hollow body connected to the reader tube and the deflectable wall portion is a flexible diaphragm spanning an opening in the body, the diaphragm alone being exposed to the first gauge port.

In the illustrated embodiment of a differential pressure gauge, a diaphragm spanning an opening in the gauge vessel wall has its outer face exposed to a first pressure chamber communicating with a first gauge port, and its inner face engaged, within the gauge vessel, by a piston head urged against the diaphragm by a plate spring pack to provide the required resilient biasing of the diaphragm: the piston head is carried by a rod extending through a gland in the opposite wall of the gauge vessel to a further piston head engaging a second diaphragm that divides a housing into a vented chamber on the diaphragm side facing the piston head and a second pressure chamber communicating with a second gauge port.

Arithmetic summing of pressures applied to two or more gauge ports may be achieved by the provision of appropriately biased deflectable gauge vessel wall portions, or diaphragms spanning openings in the gauge vessel, exposed to individual pressure chambers communicating with respective gauge ports: for algebraic summing of pressures the construction of the differential gauge described above may be modified so that the gauge vessel has a set of openings spanned by diaphragms respectively arranged to move in response to the difference between individual pairs of pressures. Area of biasing variations between the several deflectable wall portions or diaphragms may provide for "weighting" of the response of the gauge to the individual gauge port applied pressures or pressure pair differentials.

For certain applications it may be desirable to provide a differential pressure or summing pressure gauge with a pair of gauge vessels, each communicating with an individual reader tube, having at least one common deflectable wall portion or diaphragm biased to a neutral position and exposed, e.g. through a force transmission system, to opposed pressure chambers having individual gauge ports: by such a construction the higher of opposing pressures, or the preponderance of the sum of a set of pressures over their associated pairs, may be presented by the rising of liquid in one reader tube.

THE DRAWINGS

The invention is illustrated by way of example in the single accompanying FIGURE showing a schematic sectional view of a differential pressure gauge embodying the invention.

The illustrated drawing is schematic in order clearly to indicate the principles involved and the drawing omits constructional details unnecessary to an understanding of these principles.

Thus the illustrated gauge shown comprises a body 20 having a through-bore in which a piston rod 22 is reciprocable. The body is formed with recesses 23, 24 respectively housing piston heads 25, 26 carried by the piston rod 22. The recesses 24, 24 are closed by plugs 27, 28 respectively, these plugs trapping respective diaphragms that engage the piston heads 25, 26. The plug 27 has a central gauge port 29 whereas the plug 28 has a central gauge port 30, the gauge ports 29, 30 respectively communicating with passages extending to pressure pickup connections (not shown).

The recess 23 defines a guage vessel that communicates with a lateral reader tube 31. The bore of the reader tube 31 may be of uniform cross-section throughout its length or it may have other configurations, generally as discussed in connection with the embodiment of FIG. 1 and the modification of FIG. 3.

The gauge vessel constituted by the recess 23 is filled with liquid and also contains a pack of spring plates 32 that urges the piston head 25 to the right as seen in the drawing and thus in opposition to movement of the diaphragm engaged by the piston head 25 in response to the application of fluid pressure to the gauge port 29.

Suitable seals such as the 'O' ring as indicated at 33 isolate the recesses 23, 24 from one another while not restricting movement of the piston rod 22 in the bore 21. The recess 24 has an external connection 34.

The gauge construction may be utilised to indicate the difference between fluid pressures applied to the respective gauge ports 29 and 30: for such applications the external connection 34 would serve as a vent for the recess 24 so that the diaphragm engaging the piston head 26 would apply to the latter a force significant of the difference between the pressure at gauge port 30 and ambient, this force supplementing the spring biasing due to the spring plates 32 in resisting leftwards movement of the piston head 25 in response to fluid pressure applied to the gauge port 29.

However, the gauge construction may also be applied to the algebraic summation of fluid pressures applied respectively to the gauge ports 29 and 30, and to the connection 34, whereby the force applied to the piston head 26 by the diaphragm in contact therewith would be significant of the difference between the fluid pressures applied to the gauge port 30 and the connection 34 respectively.

Recesses 23, 24 have the same cross-sectional area and the arrangement is symmetrical so that equal pressures at gauge ports 29 and 30 produce equal and opposite thrusts upon the piston heads 25, 26 and no net force tending to displace the piston rod 22. However, it will be understood that one recess might be made larger than the other so as to suit the gauge for indicating proportionately related pressures at the respective gauge ports.

The drawing shows the reader tube 31 as being integrally formed with the body 20. The constructional form may be adopted by using a suitable transparent material of construction such as, for instance, a polycarbonate resin.

I claim:

1. A pressure gauge comprising:
   a. a gauge vessel filled with indicating liquid, the gauge vessel having at least one deflectable wall portion;
   b. a reader tube communicating with said gauge vessel and into which said indicating liquid extends as a column;
   c. a first gauge port directly exposing said deflectable wall portion to a first fluid pressure to be applied whereby said first pressure tends to deflect said wall portion to reduce the gauge vessel volume;
   d. a second gauge port at which a second fluid pressure is to be applied, the deflectable wall portion being indirectly exposed to the second fluid pressure applied at the second gauge port and said second fluid pressure producing a force on the deflectable wall portion opposing that arising from the first fluid pressure; and
   e. biasing means acting on said deflectable wall portion to oppose its deflection in response to the first fluid pressure applied at the first gauge port.

2. The pressure gauge of claim 1, further comprising a second deflectable diaphragm exposed to the second gauge port.

3. A pressure gauge comprising:
   a. a gauge vessel filled with indicating liquid, the gauge vessel defining a first pressure chamber between a deflectable diaphragm spanning an opening in said gauge vessel and a wall opposite to the diaphragm;
   b. a reader tube communicating with said gauge vessel and into which said indicating liquid extends as a column;
   c. a first gauge port directly exposing said deflectable diaphragm to a first fluid pressure to be applied whereby said first fluid pressure tends to deflect said diaphragm to reduce the gauge vessel volume;
   d. a piston head and a plate spring pack within the gauge vessel urging said piston head against said diaphragm to oppose its deflection in response to the first fluid pressure applied at the first gauge port;
   e. a rod carrying said piston head and extending through a bore in the wall of the gauge vessel;
   f. a further piston head carried by said rod;
   g. a second vented pressure chamber;
   h. a second gauge port at which a second fluid pressure is to be applied; and
   i. a second deflectable diaphragm between the second gauge port and the second vented pressure chamber, the further piston head extending into the second vented pressure chamber and engaging the second diaphragm, the first diaphragm being indirectly exposed to the second fluid pressure applied at the second gauge port by movement of the piston heads under the second fluid pressure and said second fluid pressure producing a force on the first diaphragm opposing that arising from the first fluid pressure.

* * * * *